Nov. 20, 1951     C. B. DE VLIEG     2,575,945
MACHINE TOOL POSITIONING MECHANISM
Filed June 21, 1947
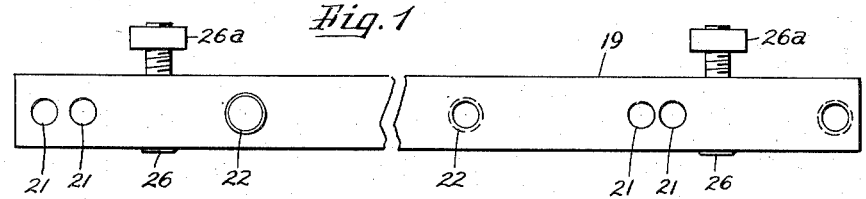
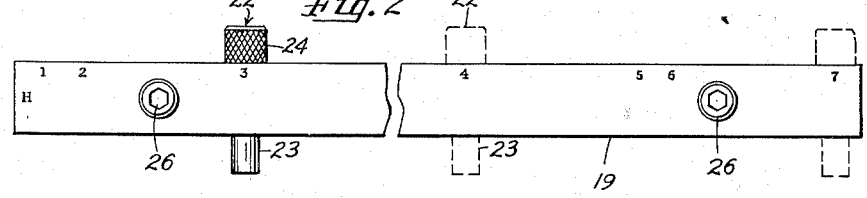
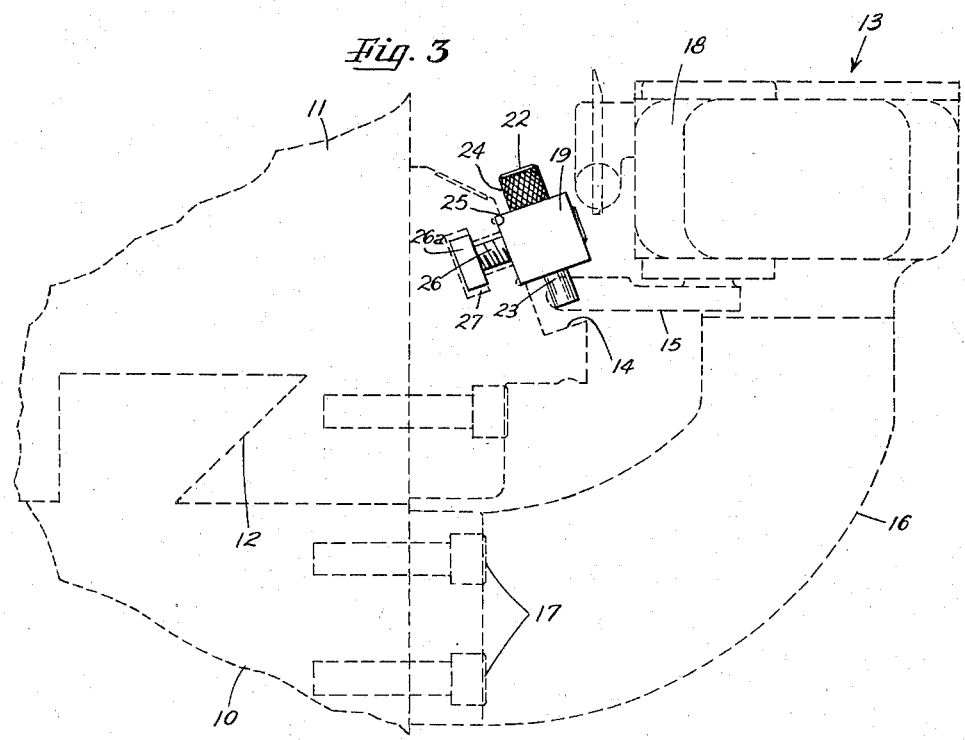
INVENTOR.
Charles B. DeVlieg
BY McCanna & Morsbach
ATTYS.

Patented Nov. 20, 1951

2,575,945

UNITED STATES PATENT OFFICE 2,575,945

MACHINE TOOL POSITIONING MECHANISM

Charles B. De Vlieg, Farmington, Mich.

Application June 21, 1947, Serial No. 756,263

7 Claims. (Cl. 90—21)

1

This invention relates to machine tools or other devices equipped with mechanism for automatically effecting movement of a work piece support or other operating support such as a tool support into preselected relative positions, and has more particular reference to the gauge means for actuating the positioning mechanism.

An object of the invention is the provision in a machine of the above character of improved locating means whereby precision machining operations can be repeatedly performed on given work pieces with much less skill requirement and chance for error than was heretofore possible with the use of end measure gauges and micrometers which had to be set individually for each location.

Another object is the provision of improved locating means which eliminates a large measure of skill and errors particularly adaptable for short run production work with a standard machine tool without the use of special jigs and fixtures.

Another object of the invention is to provide a simple fool-proof and rapid method of selectively positioning successive work pieces for required machining operations.

Another object of the invention is the provision in a machine of the above character with improved precision gauge means whereby machining operations on successive work pieces can be repeated within precision limits and when the desired machining operations are finished, can be filed away for future use.

Another object of the invention is the provision for accurately locating successive work pieces in a machine of the above character such that no measuring skill or instruments are required by the operator after the initial set-up.

Other objects and advantages of the invention will become apparent from the following detailed description taken in connection with the accompanying drawings, in which—

Figure 1 is an enlarged top view of a master strip embodying my invention;

Fig. 2 is a side view similar to Figure 1, and

Fig. 3 is a sectional view through a machine tool showing a master strip mounted in an operative position thereon.

Referring now to the drawings, the invention is shown embodied in a machine tool. In the present instance the latter comprises a base or support 10 and a slide or carriage 11 mounted on the ways 12 for movement relative to the base 10. The slide 11 is shaped to support a work piece, not shown. Movement of the slide

2

11 relative to the base 10 positions the work piece on the machine for a machining operation. A control mechanism designated generally by 13 serves to automatically control the position of the slide 11 with respect to the base 10 and to a cutting tool, not shown, so that the work piece will be moved to a preselected position with respect to the cutting tool. Such control mechanism may also be applied to a tool carrying slide. This control mechanism is of the construction shown in application Serial Number 603,452, filed August 2, 1945, Patent No. 2,561,346, granted July 24, 1951, for Automatic Positioning Means for Machine Tool Support. The showing of this control mechanism is for purpose of illustration only, and the present invention is intended for use with any suitable control mechanism of this character. At one side of the slide is formed a shelf trough, mounting means, or ledge 14 for supporting conventional end measuring gauges or micrometers, not shown, for actuating the control means. In this case the control means includes a lever 15 pivotally mounted on a bracket 16 rigidly supported to the base 10 by bolts 17. The lever 15 is shaped to overlie the ledge 14 such that end measuring gauges positioned thereon moves the lever 15 which in turn actuates the mechanism in housing 13 at the upper end of the bracket 16 to accurately position the slide 11 relative to the base.

Previously, in using machines of the foregoing character the operator has had to position the work piece for each machining operation by using end measuring gauges or the like. It is readily apparent that where a plurality of identical work pieces are to be machined considerable time is wasted if each machining operation requires the use of end measuring gauges for positioning the work piece on the machine. Accordingly, my invention is directed to means whereby a plurality of work pieces requiring identical machining operations can be properly located in the machine tool in a minimum of time without use of measuring instruments after the initial set-up of the machine for a particular job. Thus it contemplates a master strip 19, having the respective machining operations indicated thereon, supported on the slide 11 and means selectively engageable with the strip at the respective points indicating the machining operations and engageable with the lever 15 to actuate the latter. Thus, by varying the position of the latter means along the strip, the work piece can be automatically positioned in the machine for any preselected machining operation.

The master strip 19 in the present embodiment of the invention is in the form of an elongated bar (see Figure 1) of material having a generally square cross section (see Fig. 3). The predetermined machining operations are indicated on the bar by apertures 21 (see Figure 1) formed thereon. The apertures 21 are spaced lengthwise along the bar and each aperture 21 corresponds to a machining operation. Although not necessary, the apertures may be numbered, as shown in Fig. 2, for convenience of the operator. The means for selectively engaging the bar 19 in this embodiment of the invention is in the form of a pin 22 shaped to fit the apertures 21. The pin comprises an elongated body portion 23 adapted to extend through the apertures 21 and project beyond the opposite side of the bar 19 a sufficient distance to engage the lever 15, and a head 24 for supporting the pin 22 on the bar 19. Each of the apertures 21 is of the same size and is shaped so that the pin 22 will fit snugly therein but at the same time can be readily removed. For convenience in handling the pin, the head 24 may be knurled as shown in Figs. 2 and 3.

Means is provided for adjustably and removably securing the bar 19 to the slide 11. To this end an elongated groove 25 is formed on the slide 11 for the reception of the bar 19. The latter is retained in position by bolts 26 projecting through the bar 19 and threadable into nuts 26a disposed in an inverted T-shaped slot 27 formed beneath, and interconnected with the groove 25. This construction permits ready adjustment of the bar relative to the slide during the set-up and assures the retention of the bar in position during the operation of the machine.

From the foregoing it is apparent that any particular master strip 19 is usable only for making similar or interchangeable work pieces requiring repeat machining operations of a predetermined pattern. Where a different pattern of machining operations is required as for example on a different part, a different master strip 19 will be used. Thus each distinct work piece requires a different master strip. An important advantage arising from requiring a different premarked master strip for each distinct work piece is that after the required number of work pieces have been made for any set-up of the machine, the master strip can be removed from the machine and stored away for future use.

When machining operations have to be made on two mating parts such as in a gear housing with a cover, the master strip 19 is attached to the slide 11 in the usual manner for one of the parts such as the housing and is inverted end for end on the slide 11 in machining the other part such as the cover. Thus it is evident that all apertures and the like formed on the respective parts will be in register.

The use of the master strip is readily apparent from the foregoing but may be summarized as follows. An elongated bar is formed with holes 21 corresponding to preselected machining operations to be performed on the work piece, the measurements for the distances between the respective holes being obtained from blueprints or the like for the particular work piece. The bar 19 is then secured to the slide 11 as shown in Fig. 3. The machine is started and the pin 22 is inserted in each of the respective holes 21 in succession. Thus, for example, assume that the pin 22 is inserted in the hole marked No. 1 in Fig. 2 and that the slide 11 is caused to be moved relative to the support 10. As soon as the pin 22 engages the lever 15, movement of the slide is stopped. If the work piece and slide 11 have been initially properly alined the work piece will be properly positioned for the machining operation corresponding to the hole 21, designated by the numeral No. 1 in Fig. 2. At the completion of this operation the pin 22 is removed from the hole marked No. 1 and is inserted in the hole marked No. 2. The slide 11 is again caused to be moved relative to the base 10 and when the pin 22 engages the lever 15 the work piece will be alined for the machining operation corresponding to the position of the hole marked No. 2. The pin 22 is removed and inserted in each successive hole until the completion of the machining operation. At the completion of the machining operation the work piece is replaced by another blank work piece and the foregoing procedure is repeated.

After the initial set-up, it is readily apparent that blueprints and end measuring gauges are unnecessary. This greatly increases production. Moreover the chances for personal errors entering into and effecting any particular machining operation is minimized.

The reference herein and in the claims to a support for a work piece is intended to comprehend equivalent structure as applied to the support and movement of a cutting tool.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. In a machine tool comprising, a support, a slide movable relative to said support and arranged to support a work piece adapted to be machined in a predetermined manner and having means controlling the relative movement between said slide and said support for positioning the work piece in the machine for a machining operation, an elongated strip arranged to be detachably secured to said slide in a predetermined manner having a plurality of apertures formed thereon, each corresponding to a particular machining operation to be performed on said work piece, and a pin shaped to be readily inserted and removed in any of said apertures and arranged to be engageable with said control means whereby the position of the slide relative to the support is such that the work piece is aligned in the machine for the machining operation corresponding to the aperture in which said pin was previously inserted.

2. In a machine utilized for performing a plurality of identical successive operations on each of a plurality of work pieces, the combination of a support element, a slide element mounted on said support element and movable relative thereto, control means for limiting the movement of said slide element relative to said support element, a movable member mounted on one of said elements for actuating said control means, means detachably secured to one of said elements effectively defining plurality of spaced apertures each corresponding to a different one of the successive operations to be performed on the work piece, and means positioned by said apertures and engageable with said member for moving the latter to actuate the control means automatically to stop relative movement between said slide element and said support element at a position of the work piece relative to an associated device for performing an operation corresponding to the aperture in which the latter means is positioned.

3. In a machine tool adapted for performing a plurality of successive machining operations on a work piece, the combination of a support, a slide mounted on said support and movable relative thereto, control means for selectively limiting the movement of said slide relative to said support, a strip detachably secured to said slide and having a plurality of spaced apertures defined therein each aperture corresponding to one of the plurality of successive machining operations to be performed on the work piece, an a pin manually insertable into each of said apertures and inserted into the one of said apertures prior to relative movement between said slide and said support to the particular relative positions thereof determined by the particular aperture into which said pin is inserted, said pin being shaped to fit snugly into each of said apertures and having an end shaped to actuate said control means during the relative movement of the slide with respect to said support accurately to position the work piece relative to an associated tool for the machining operation corresponding to the aperture in which the pin is positioned.

4. In a machine tool adapted for performing a plurality of successive machining operations on a work piece, the combination of a support, a slide mounted on said support and movable relative thereto and having an elongated slot formed along one side, control means mounted on said support adjacent said slot for selectively limiting the movement of said slide relative to said support, an elongated strip having a plurality of spaced apertures defined therein each aperture corresponding to one of the plurality of successive machining operations to be performed on the work piece, means interfitting with said slot for securing said strip to said slide, and a pin manually insertable into each of said apertures and inserted into the one of said apertures prior to relative movement between said slide and said support to the particular relative positions thereof determined by the particular aperture into which said pin is inserted, said pin being shaped to fit snugly into each of said apertures and having an end shaped to actuate said control means during the relative movement of the slide with respect to said support accurately to position the work piece relative to an associated tool for the machining operation corresponding to the aperture in which the pin is positioned.

5. In a machine for performing a plurality of repeated operations on successive work pieces, the combination of, base means, slide means movable relative to said base means, a trough supported on one of said means, control means for automatically positioning and limiting movement of said slide means relative to said base means, means for supporting a readily interchangeable elongated strip along said trough for actuating said control means the particular strip depending on the particular work pieces upon which operations are to be performed, said strip having a plurality of positively defined positions provided thereon each representative of a particular operation on a work piece, a cooperating element selectively engageable only at certain positively defined positions on said strip, said strip and cooperating element causing said control means automatically to position said slide means relative to said base means at different predetermined relative positions dependent upon the particular positively defined position with which said element is associated.

6. In a machine tool adapted for performing a plurality of repeated machining operations on successive work pieces the combination of, a support, a slide movable relative to said support and shaped to support a work piece, control means for automatically positioning and limiting the movement of the slide, and selective means comprising a readily removable and replaceable bar having a plurality of spaced indentically formed deformations therealong and a member adapted selectively to cooperate with different ones of said deformations for actuating said control means to position said slide on the support in a manner whereby the work piece is automatically located for the selected machining operation after said member has been positioned to cooperate with the deformation corresponding to the selected machining operation.

7. In a tool for performing a plurality of successive operations on a work piece, the combination of a base, a slide mounted on said base and movable relative thereto, control means for automatically limiting the movement of said slide relative to said base, readily removable and replaceable means comprising an elongated member for each group of workpieces upon which identical operations are to be performed, said elongated member having the respective operations to be performed on such workpieces positively defined thereon, and means selectively interfitting with the latter means only at the positively defined positions and shaped to actuate said control means during the relative movement of the slide with respect to the base to position the work piece relative to an associated device for the selected operation, said last mentioned means being interfitted with said latter means at a particular one of said positively defined positions before relative movement of said slide and base to the selected position corresponding to the particular one of said positions occurs.

CHARLES B. DE VLIEG.

REFERENCES CITED

The following references are of record in the file of this patent:

UNITED STATES PATENTS

| Number | Name | Date |
| --- | --- | --- |
| 1,023,184 | Watts et al. | Apr. 16, 1912 |
| 1,273,235 | Lamphere | July 23, 1918 |
| 1,660,435 | Craley | Feb. 28, 1928 |
| 1,785,395 | Shaw et al. | Dec. 16, 1930 |
| 2,167,189 | Verderber | July 25, 1939 |
| 2,283,338 | Pegard | May 19, 1942 |
| 2,369,223 | Ferger | Feb. 13, 1945 |